United States Patent [19]

Adler et al.

[11] Patent Number: 5,302,475

[45] Date of Patent: Apr. 12, 1994

[54] RECHARGEABLE ZINC CELL WITH ALKALINE ELECTROLYTE WHICH INHIBITS SHAPE CHANGE IN ZINC ELECTRODE

[75] Inventors: Thomas C. Adler, Berkeley; Frank R. McLarnon, Orinda; Elton J. Cairns, Walnut Creek, all of Calif.

[73] Assignee: The Regents of the University of California, Oakland, Calif.

[21] Appl. No.: 791,583

[22] Filed: Nov. 12, 1991

[51] Int. Cl.$^5$ .......................................... H01M 10/34
[52] U.S. Cl. .................... 429/207; 429/188; 429/223; 429/229
[58] Field of Search ................ 429/207, 188, 229, 223

[56] References Cited

U.S. PATENT DOCUMENTS 3,485,673  12/1969  Jost ........................................ 136/28
4,247,610  1/1981  Thornton ............................ 429/199

OTHER PUBLICATIONS

McLarnon, Frank R., et al., "The Secondary Alkaline Zinc Electrode", *J. Electrochem. Soc.*, vol. 138, No. 2, Feb., 1991, pp. 645-664.

Nichols, James T., et al., "Zinc Electrode Cycle-Life Performance in Alkaline Electrolytes Having Reduced Zinc Species Solubility", *Chem. Eng. Commun.*, vol. 37, pp. 355-379, 1984.

*Primary Examiner*—Stephen Kalafut
*Assistant Examiner*—M. Nuzzolillo
*Attorney, Agent, or Firm*—Paul R. Martin; Kathleen S. Moss; Pepi Ross

[57] ABSTRACT

An improved rechargeable zinc cell is described comprising a zinc electrode and another electrode such as, for example, a nickel-containing electrode, and having an electrolyte containing KOH and a combination of KF and $K_2CO_3$ salts which inhibits shape change in the zinc electrode, i.e., the zinc electrode exhibits low shape change, resulting in an improved capacity retention of the cell over an number of charge-discharge cycles, while still maintaining high discharge rate characteristics.

13 Claims, 3 Drawing Sheets

RECHARGEABLE ZINC CELL WITH ALKALINE ELECTROLYTE WHICH INHIBITS SHAPE CHANGE IN ZINC ELECTRODE

The invention described herein arose in the course of, or under, Contract No. DE-AC03-SF00098 between the United States Department of Energy and the University of California.

BACKGROUND OF THE INVENTION

1. Field of the Invention

This invention relates to a rechargeable zinc cell containing an improved electrolyte which inhibits shape change in the zinc electrode while maintaining high discharge rates.

2. Description of the Related Art

Rechargeable cells containing zinc electrodes such as, for example, nickel/zinc, silver/zinc, and zinc/air cells, are of significant interest due to the abundance and, therefore, low cost of zinc, as well as low equivalent weight, high coulombic efficiency, resistance to corrosion, reversible electrochemical behavior, and reduced environmental disposal problems (e.g., in comparison to lead or cadmium).

When combined with a nickel positive electrode (NiOOH/Ni(OH)$_2$), the zinc cell also exhibits a high cell voltage of about 1.65 volts, which may be compared to 1.5-1.9 for a silver-zinc cell and 1.2-1.3 volts for a zinc-air cell.

However, while the above characteristics make such rechargeable zinc cells excellent candidates for applications such as electric vehicles and other portable power applications, the zinc electrode is not without problems. When used, for example, with electrolytes such as KOH (or a combination of KOH and LiOH, with the LiOH added to improve the performance of the nickel-containing electrode), to provide high ionic conductivity in the cell and, therefore, a high discharge rate, the zinc electrode tends to change its shape on its electrode support, apparently due to the high solubility of intermediate products formed as the zinc electrode discharges.

When the zinc electrode discharges, metallic zinc oxidizes to form zinc oxide. However, intermediate products such as zinc hydroxides or zincates, e.g., (Zn(OH)$_4^{-2}$), form during the oxidation reaction which are very soluble in the KOH electrolyte. Furthermore, while the ionic conductivity of the electrolyte increases with increases in the concentration of the KOH electrolyte, the solubility of such zinc products in KOH also increases with the concentration of KOH.

The result is that when the cell is recharged, the reduced zinc may not occupy the same space as it did before it went through the discharge cycle. In particular, as shown in prior art FIG. 1 the edges of the original electrode gradually lose zinc electrode material, i.e., the total active area of the zinc deposit tends to decrease, resulting in a gradual loss in capacity of the cell. In fact, it is not unusual for a such a cell, after about 100-150 charge and discharge cycles to operate at less than 80% of its initial capacity A number of possible solutions have been proposed, including the use of calcium in the zinc electrode to form an insoluble calcium zinc hydroxide such as CaZn$_2$(OH)$_6$ rather than the more-soluble zincates.

It has also been previously proposed to add other salts to the KOH electrolyte which would permit the use of a lower concentration of KOH while still providing the desired high ionic conductivity, to thereby inhibit shape change in the zinc electrode.

The use of alkaline-fluoride (KOH/KF) and alkaline-borate (KOH/K$_3$BO$_3$) electrolytes to reduce the solubility of the zinc species was reported by Nichols and two of the inventors in this application, in an article entitled "Zinc Electrode Cycle-Life Performance in Alkaline Electrolytes having Reduced Zinc Species Solubility", which was published in Chem. Eng. Commun., Volume 37, pp. 355-379 in 1985. Although improvement in shape change or zinc electrode area retained was reported with the use of an alkaline-fluoride electrolyte, it was noted by the authors that in cells using such electrolytes the cell capacity is more sensitive to zinc area loss than in cells using standard electrolyte.

Thornton U.S. Pat. No. 4,247,610 disclosed a zinc battery aqueous electrolyte which contains 18-30% KF and 2-15% KOH with a KF plus KOH total concentration of 20-45%.

It has also been proposed to use potassium carbonate (K$_2$CO$_3$) as an additive in a KOH electrolyte to reduce the shape change of the zinc electrode. McLarnon and Cairns, two of the three inventors of this invention, reported on the use of potassium carbonate, as well as a number of other additives to KOH electrolytes, to reduce shape change in zinc electrodes, in an article entitled "The Secondary Alkaline Zinc Electrode", published in the Journal of the Electrochemical Society Volume 138, No. 2, at pages 645-664, in February, 1991.

Jost U.S. Pat. No. 3,485,673 described and claimed a battery system comprising a positive electrode consisting of electrochemically active nickel material, a negative electrode consisting of electrochemically active zinc material, and an electrolyte consisting of an aqueous solution of potassium hydroxide and potassium carbonate.

However, while the use of KOH/KF or KOH/K$_2$CO$_3$ electrolytes in a cell containing a zinc electrode does reduce the shape change in the zinc electrode, the amount of shape change and resulting charge capacity loss in such cell after 300 charge/discharge cycles is still unacceptable. Prior art FIGS. 2 and 3 show significant reduction in zinc electrode area in cells respectively using KOH/KF or KOH/K$_2$CO$_3$ electrolytes after, respectively, 383 and 373 charge/discharge cycles.

There is, therefore, still a need for providing a rechargeable zinc cell which would exhibit low shape change in the zinc electrode, i.e., the capability of retaining greater than 80% of the initial capacity of the cell after 350 or more cycles of use, while still exhibiting a high electrolyte conductivity, i.e., a high charge and discharge rate.

SUMMARY OF THE INVENTION

Quite surprisingly, we have discovered that by using both fluoride and carbonate salts together in a KOH electrolyte in a rechargeable zinc cell, a synergistic lowering of the shape change in the zinc electrode can be achieved, relative to the independent use of either fluoride or carbonate salts alone in a KOH electrolyte in such a cell, whereby the capacity retention of the cell remains above 80% for well over 350 cycles.

DETAILED DESCRIPTION OF THE INVENTION

The invention comprises an improved rechargeable zinc cell having an electrolyte containing KOH and the combination of KF and $K_2CO_3$ salts which inhibits shape change in the zinc electrode, i.e., the zinc electrode exhibits low shape change, resulting in an improved capacity retention of the cell over a number of charge-discharge cycles, while still maintaining the high discharge rate characteristics of the cell.

By "rechargeable zinc cell" is meant a cell having a zinc electrode, and by "zinc electrode" is meant an electrode containing an electrochemically active form of a zinc-containing material capable of being repeatedly cycled between an oxidized and a reduced state. Examples of such rechargeable zinc cells include nickel/zinc cells (containing a nickel electrode as NiOOH in the charged state); zinc/air cells; silver/zinc cells (containing a silver electrode as silver oxide in the charged state); and manganese/zinc cells (containing a manganese electrode as manganese dioxide in the charged state).

By the term "low shape change" is meant that the active zinc-containing material of the zinc electrode, after at least 350 charge/discharge cycles, occupies a sufficient amount of its initial area on the electrode to provide at least 80% of the initial capacity of the electrode By use of the term "high discharge rate" is meant a discharge rate of from at least about 30 to about 200 watts per kilogram or higher. In many cases, the discharge rate of the rechargeable cell of the invention will be well over 200 watts per kilogram, thus evidencing that the high discharge rate characteristic of zinc cells with KOH electrolytes has been retained, while improving upon the capacity retention of the cell and reducing the shape change in the zinc electrode.

Figure 1:
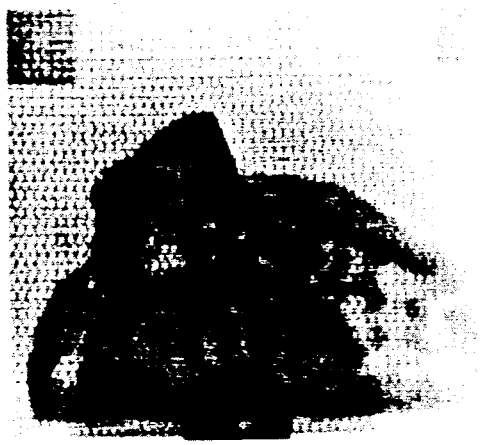
FIG. 1 is an x-ray image of a zinc electrode after 189 cycles of use in a prior art sealed nickel/zinc cell employing an electrolyte containing 6.8M KOH and 0.6M LiOH, showing the loss of zinc electrode active area or shape change due to solubility and migration of the active zinc material across the face of the electrode.
Figure 2:
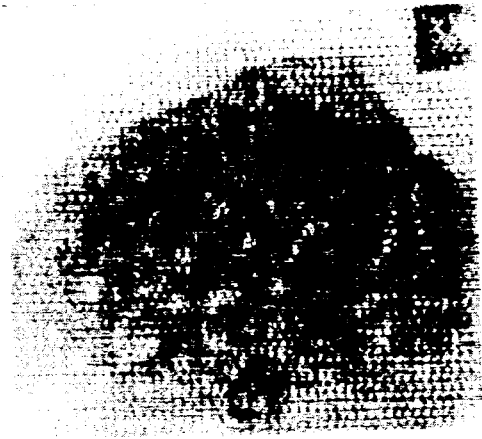
FIG. 2 is an x-ray image of a zinc electrode after 383 cycles of use in a prior art vented nickel/zinc cell employing an electrolyte containing 3.5M KOH and 3.3M KF, which still shows a significant loss of zinc electrode area.
Figure 3:
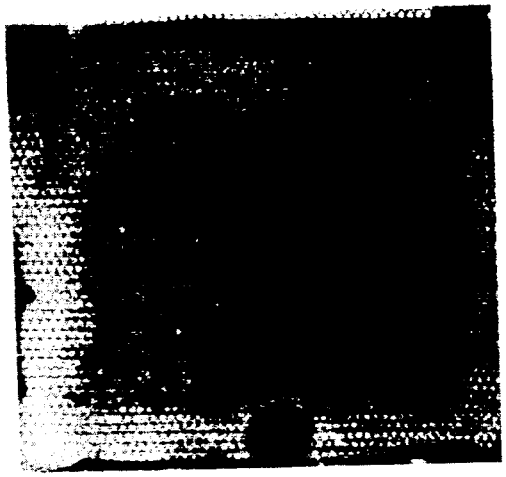
FIG. 3 is an x-ray image of a zinc electrode after 373 cycles of use in a prior art vented nickel/zinc cell employing an electrolyte containing 2.5M KOH, 2.5M $K_2CO_3$, and 0.5M LiOH, which also shows a significant loss of zinc electrode area.
Figure 4:
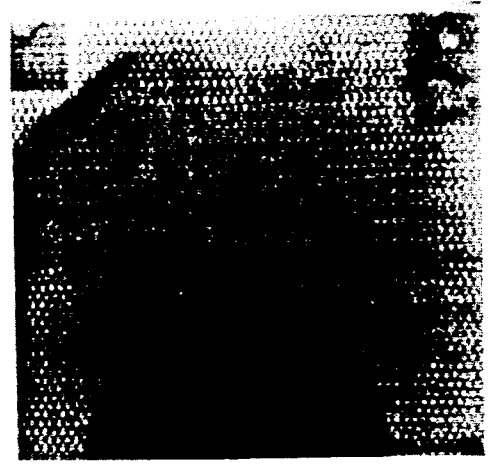
FIG. 4 is an x-ray image of a zinc electrode after 365 cycles of use in the rechargeable nickel/zinc cell of the invention operating in a sealed mode which employs an electrolyte containing KOH, $K_2CO_3$, and KF, and which shows a marked reduction in loss of zinc electrode area.
Figure 5:
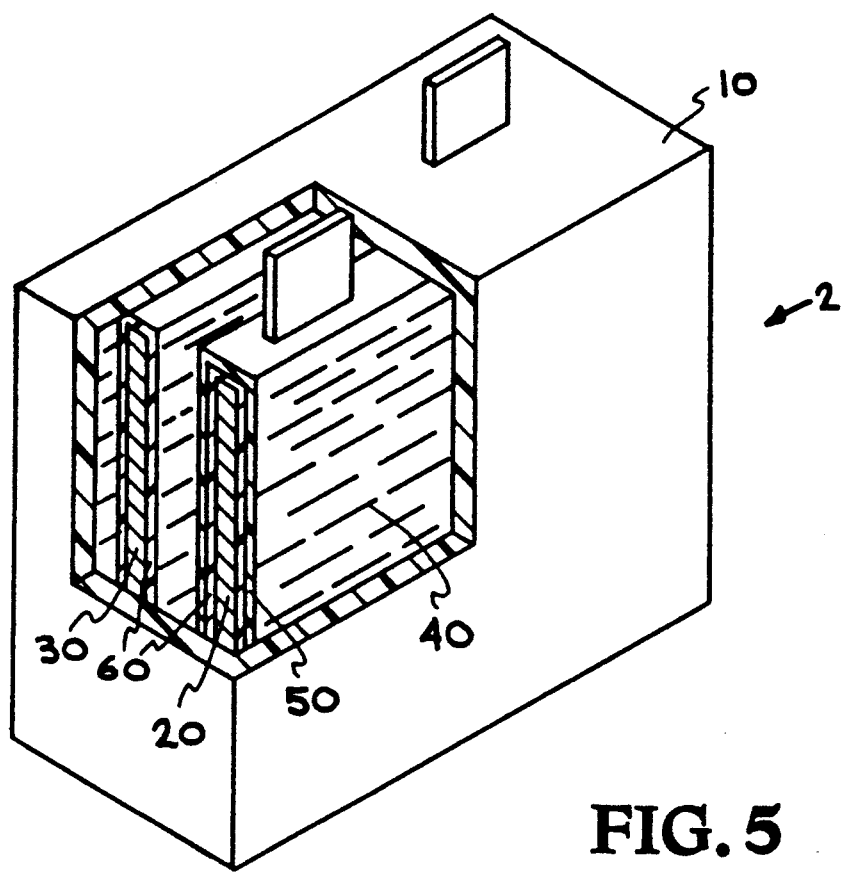
FIG. 5 is a partially cutaway view of a rechargeable nickel/zinc cell representative of the rechargeable cell of the invention.

Referring now to FIG. 5, a rechargeable nickel-zinc cell, representative of the rechargeable cell of the invention, is generally shown at 2 comprising a cell casing 10, a zinc electrode 20, a NiOOH electrode 30, electrolyte 40, a wick 60 (e.g., nylon fiber material) around both zinc electrode 20 and NiOOH electrode 30 to promote wetting of the electrodes, and a separator layer 50 over wick 60 around zinc electrode 20. The construction of zinc electrode 20, NiOOH electrode 30, separator layer 50, and wick 60, in the cell of the invention, may comprise any conventional formation of such components.

However, the improved electrolyte used in the rechargeable cell of the invention comprises a combination of KOH, KF, and $K_2CO_3$ which has been found to have a synergistic effect on the inhibition of shape change in the zinc electrode of the cell, apparently due to both a lowering of the solubility of the zinc electrode in the electrolyte, as well as a change in the reaction kinetics in the cell.

The amount or concentration of KOH in the electrolyte may range from as little as about 2 molar (M) to as much as about 12M. Preferably, however, the concentration of KOH in the electrolyte will range from about 2.5 to about 7M.

The amount or concentration of KF in the electrolyte may range from about 0.5M to about 4M. Preferably, the concentration of KF in the electrolyte will range from about 1 to about 3.5M, and most preferably the concentration of KF in the electrolyte will range from about 1.0 to about 3.2M.

The amount or concentration of $K_2CO_3$ in the electrolyte may range from about 0.5M to about 4M. Preferably, the concentration of $K_2CO_3$ in the electrolyte will also range from about 1 to about 3.5M, and the concentration of $K_2CO_3$ in the electrolyte will most preferably range from about 1.0 to about 3.2M.

To the above described electrolyte then may be added sufficient ZnO to saturate the electrolyte to thereby reduce the solubility of the zinc electrode in the electrolyte.

The use of this combination of KF and $K_2CO_3$ salts with the KOH electrolyte enables one to lower the solubility of the zinc electrode in the electrolyte without significantly lowering the discharge rate. The addition of the KF and $K_2CO_3$ salts to the electrolyte also apparently changes the reaction kinetics in the cell to actually improve the shape change stability of the zinc electrode.

The rechargeable cell of the invention may be operated in either a sealed or unsealed mode. Preferably, the cell is operated in a sealed mode to permit oxygen generated within the cell to react with zinc to inhibit the formation of zinc dendrites in the cell. When an unsealed cell is used, it may be preferable to use a one-way check valve which will permit venting gases, generated within the cell, to the atmosphere, while limiting ingress of air into the cell to control the carbonate level in the cell.

To further illustrate the invention, and the effect of the novel electrolyte used in the cell of the invention on shape change stability and retention of charge capacity, a number of identical 1.3 ampere-hour NiOOH-Zn cells were constructed using 7 cm × 6.2 cm × 1 mm thick zinc electrodes. The first cell was filled with a conventional 6.8M KOH, 0.6M LiOH electrolyte saturated with ZnO. The second cell, also representing the prior art, was filled with an electrolyte containing 3.5M KOH and 3.3M KF, and saturated with ZnO.

The third cell, also representing the prior art, was filled with an electrolyte containing 2.5M KOH, 2.5M $K_2CO_3$, and 0.5M LiOH, which was also saturated with ZnO. The fourth cell, comprising the cell of the invention, was filled with an electrolyte having a 3.2M KOH concentration, a 1.8M KF concentration, and a 1.8M $K_2CO_3$ concentration and was also saturated with ZnO. After filling the cells with the respective electrolytes, the cells were tested for shape changes in the zinc electrode and capacity retention. The first and fourth cells were tested in a sealed or unvented mode, while the second and third cells were tested in a vented mode.

Each of the cells was cycled through charge and discharge modes. After initial charging, each cell was discharged at a constant-current discharge rate of 0.5 amperes until the cell voltage dropped to about 1 volt, signifying full discharge of the cell. The amount of time for the cell to discharge until its cell voltage dropped to this point was measured. The total amount of charge, in coulombs, delivered by the cell during the discharge was then calculated (discharge time × 0.5 amperes). The cell was then recharged at a rate of 0.2 amperes for a period of time sufficient to deliver to the cell 105-110% of the previous amount of coulombs discharged by the cell, typically about 8 hours. These results were then plotted, as will be described below, to show the charge capacity retention of the cells.

After about 350 cycles (except for the first cell which survived only 189 cycles), an x-ray of each of the zinc electrodes was made, without disassembling the cells, to note the amount of shape change in the respective zinc electrodes. The x-ray photographs of FIGS. 1-4, respectively, show the shape changes in the zinc electrodes in the cells containing KOH and LiOH; KOH and KF; KOH, $K_2CO_3$, and LiOH; and KOH, $K_2CO_3$, and KF. It will be seen that the zinc electrode in the cell of the invention, which utilizes the electrolyte containing KOH, $K_2CO_3$, and KF, shows much less shape change than the zinc electrodes in the prior art cells.

Figure 6:
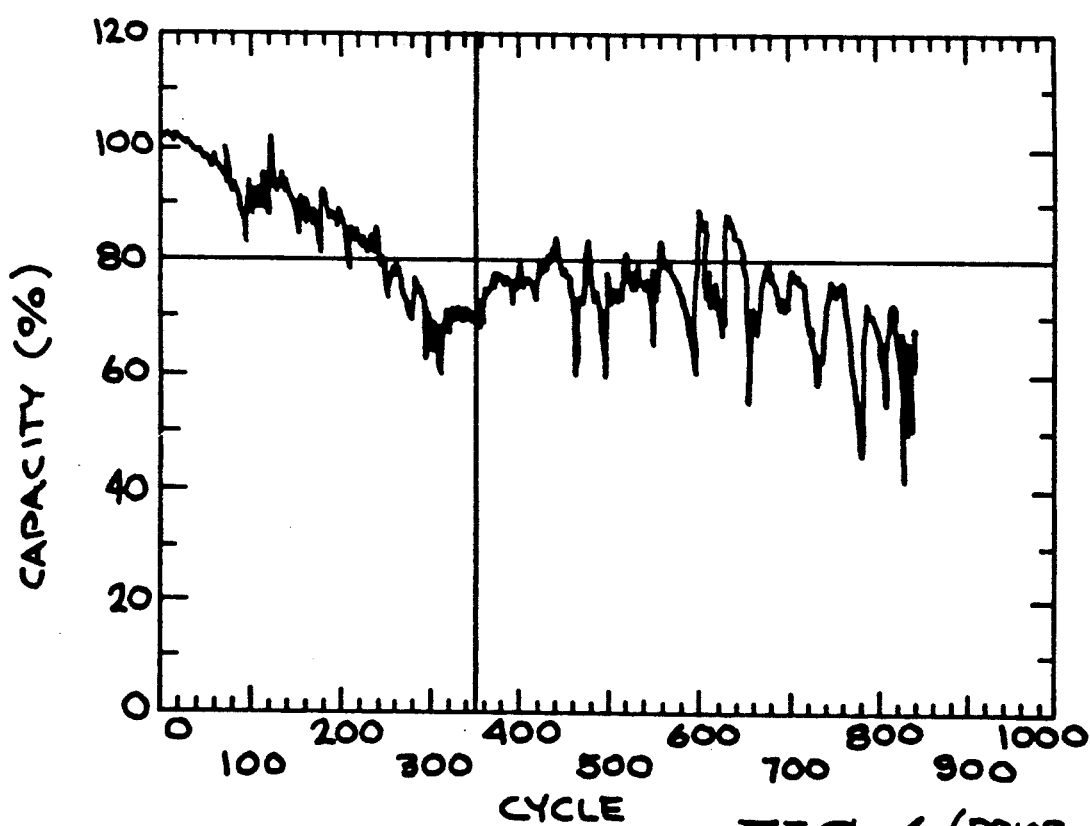
FIG. 6 is a graph plotting the capacity versus cycles of a prior art unsealed rechargeable nickel/zinc cell using a KOH/KF electrolyte.
Figure 7:
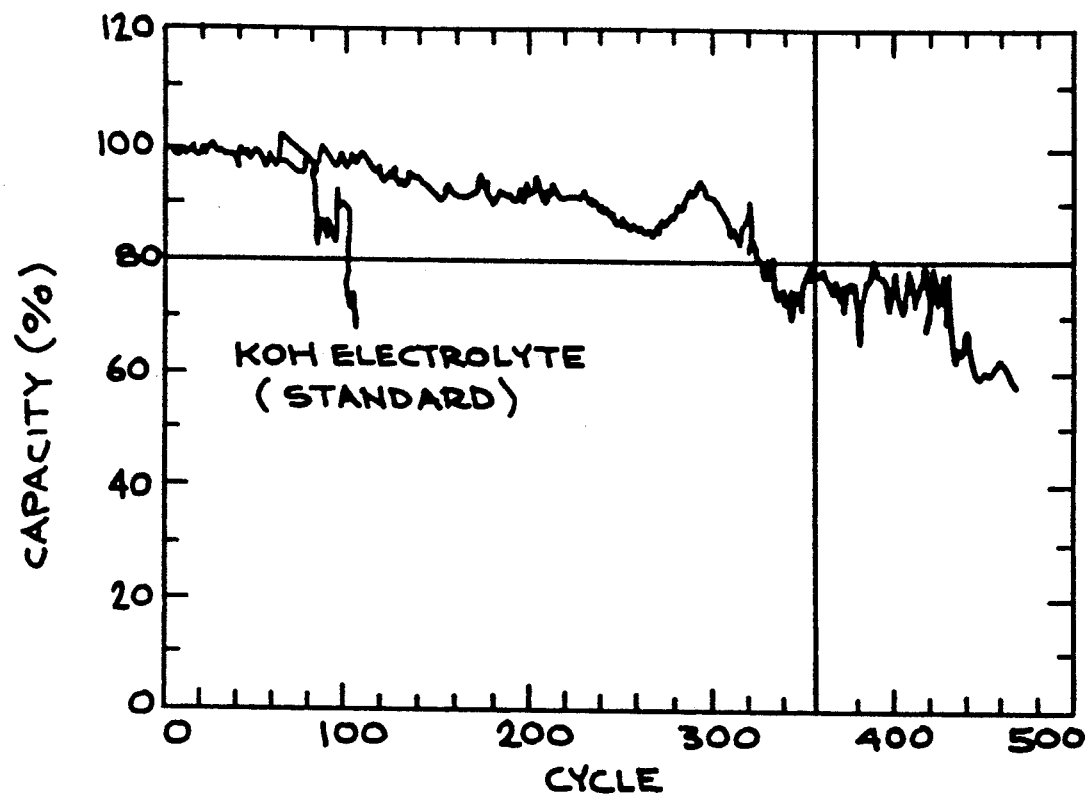
FIG. 7 is a graph plotting the capacity versus cycles of a prior art unsealed rechargeable nickel/zinc cell using a KOH/$K_2CO_3$ electrolyte.
Figure 8:
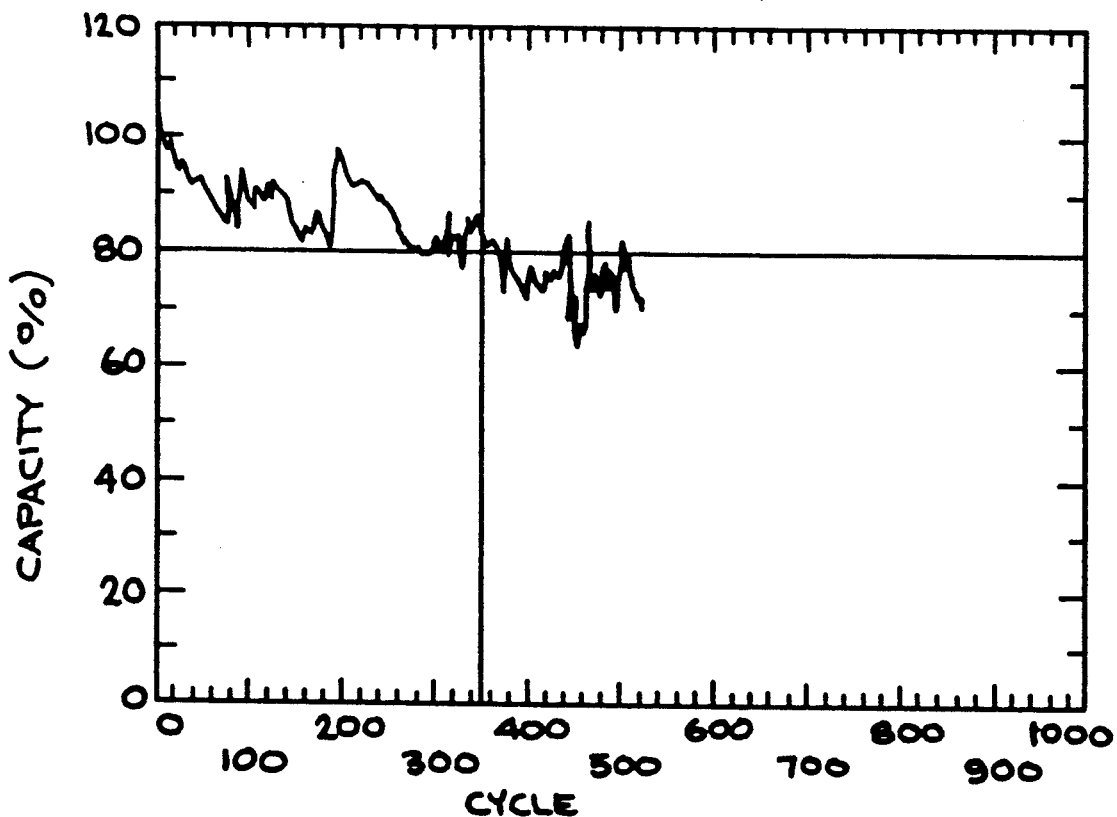
FIG. 8 is a graph plotting the capacity versus cycles of the rechargeable nickel/zinc cell of the invention operating in a sealed mode and using a KOH/KF/$K_2CO_3$ electrolyte.

The capacity retention, as a function of the number of cycles, for the cells containing the KOH and KF; KOH and $K_2CO_3$; and KOH, $K_2CO_3$, and KF electrolytes are respectively shown in FIGS. 6-8. It will be noted that the cell of the invention, containing the KOH, $K_2CO_3$, and KF electrolyte, still has an average capacity of over 80% of the initial capacity of the cell, while the other cells already begin to show a drop in capacity to below 80% of initial capacity after less than 350 cycles. This drop in capacity in the prior art cells also indicates that a significant amount of shape change in the zinc electrode has already occurred in those cells.

Thus, the invention provides a novel rechargeable zinc cell with lower shape change in the zinc electrode and enhanced capacity retention due to the presence of the improved electrolyte containing KOH and the combination of KF and $K_2CO_3$ salts.

Having thus described the invention what is claimed is:

1. A rechargeable cell containing an electrode comprising an electrochemically active zinc material, and an aqueous alkaline electrolyte which inhibits shape change in said zinc electrode, said electrolyte comprising:
   a) KOH, in a concentration of about 3.2M;
   b) KF, in a concentration of about 1.8M; and
   c) $K_2CO_3$, in a concentration of about 1.8M.

2. The rechargeable cell of claim 1 wherein one of the electrodes in said cell consists of electrochemically active zinc, and said electrolyte is saturated with zinc oxide.

3. The rechargeable cell of claim 1 wherein said cell is a sealed cell whereby zinc dendrite formation adjacent said zinc electrode is inhibited.

4. The rechargeable cell of claim 1 wherein said cell also contains an electrochemically active form of a nickel-containing electrode material.

5. The rechargeable cell of claim 1 wherein said electrochemically active form of a nickel-containing electrode material in said cell comprises a hydroxide of nickel.

6. The rechargeable cell of claim 1 wherein said cell is a zinc/air cell.

7. The rechargeable cell of claim 1 wherein said cell is a silver/zinc cell.

8. The rechargeable cell of claim 1 wherein said cell is a zinc/manganese cell.

9. A rechargeable Zn/NiOOH cell capable of a least about 30 watt/kg discharge rate comprising:
   a) a zinc electrode;
   b) a NiOOH electrode;
   c) a separator therebetween; and
   d) an electrolyte capable of inhibiting shape change in said zinc electrode and comprising:
      i) about 3.2M of KOH;
      ii) about 1.8M of KF; and
      iii) about 1.8M of $K_2CO_3$.

10. The rechargeable Zn/NiOOH cell of claim 9 wherein said electrolyte is saturated with zinc oxide to inhibit the solubility of said zinc electrode.

11. The rechargeable Zn/NiOOH cell of claim 9 wherein said cell is sealed whereby oxygen generated in said cell during operation thereof inhibits zinc dendrite formation.

12. The rechargeable Zn/NiOOH cell of claim 9 wherein said cell is vented.

13. An aqueous alkaline electrolyte for a rechargeable cell comprising:
   a) KOH, in a concentration of about 3.2M;
   b) KF, in a concentration of about 1.8M; and
   c) $K_2CO_3$, in a concentration of about 1.8M.

* * * * *